Jan. 30, 1968  E. W. SCHARRE  3,366,309
SELF-OPENING CONTAINER AND CLOSURE THEREFOR
Filed May 23, 1966  2 Sheets-Sheet 1

INVENTOR.
EDWARD W. SCHARRE
BY
ATTORNEYS

Jan. 30, 1968  E. W. SCHARRE  3,366,309
SELF-OPENING CONTAINER AND CLOSURE THEREFOR
Filed May 23, 1966  2 Sheets-Sheet 2

INVENTOR.
EDWARD W. SCHARRE
BY
ATTORNEYS

United States Patent Office 3,366,309
Patented Jan. 30, 1968

3,366,309
SELF-OPENING CONTAINER AND CLOSURE THEREFOR
Edward W. Scharre, Louisville, Ky., assignor to Anaconda Aluminum Company, a corporation of Montana
Filed May 23, 1966, Ser. No. 552,244
10 Claims. (Cl. 229—43)

ABSTRACT OF THE DISCLOSURE

A container is provided having a closure member with an enlarged opening and a heat shrinkable film adhesively sealed to the outer surface of the closure; the film has a re-orientation temperature at which it will begin to shrink and the film is attached to the closure by an adhesive which will release its adhesive bond at a temperature above the re-orientation temperature of the film, at which time the film member is under a tensile stress less than a stress sufficient to tear the film member.

---

This invention relates to a self-opening container and closures for such containers. More particularly it relates to containers having a closure member with an enlarged opening and a heat shrinkable plastic film closing the opening and attached to the closure member in such a manner that subjecting the container to an elevated temperature will cause the film to shrink away from the opening and expose the contents.

Frozen foods of the "heat-and-serve" type are generally packaged in a metal foil tray and covered with a flat closure member. Depending on the food product in the container, the closure member is either first removed and then heated or the container is heated with the closure member intact and the closure member is subsequently removed after partial or complete heating of the food product. Certain drawbacks exist in present container constructions of the type requiring removal of the closure before heating, particularly where large members of containers are to be heated such as in school cafeterias, in that removal of the individual closure members is both time consuming and unsanitary. Where it is unnecessary or undesirable to remove the closure member until some heating has taken place, for example to prevent excess moisture from accumulating or to brown the surface of the food product near the end of the heating cycle, it is inconvenient to have to remove the container from the oven in order to remove the closure member and in cafeteria use such practice is practically impossible.

It is an object of the invention to provide a container having a heat shrinkable plastic film securely sealed over an enlarged opening in a unique manner so that it will shrivel away from the opening and expose the contents at the correct time during a heating cycle.

Broadly stated, the invention is in a container of the type having a tray-like body member for holding the contents with the improvement in the combination being in a closure member. The closure member is comprised of a frame element defining a central opening, which has a heat shrinkable film with a re-orientation temperature at which shrinkage begins, secured along its marginal outer edge to the body member and closing the central opening. Adhesive means are provided for securing the film to the frame element and releasing its adhesive bond at a temperature above the re-orientation temperature of the film member and at which the film member is under a tensile stress but less than the tensile stress sufficient to tear the film member.

It is important that the film be pre-stressed before the adhesive bond releases so that upon release the film will not collapse into the contents; for a similar reason it is preferred to include means for mechanically holding at least an edge portion of the film after shrinking so that the film will shrivel in place and not be free to fly around in the oven. Various means for holding the film are described below.

It is further intended that the film and frame member can be adhesively bonded on a production scale in large sizes and subsequently cut to size; in this case, the film will be co-extensive with the outside edges of the frame element. A scoring arrangement is included in this closure construction which will sever the film inwardly along at least a major portion of the frame element so that the film will be free to shrink upon release of the adhesive bond.

A preferred embodiment of the invention is described hereinbelow with reference to the drawings wherein.

Figure 3:
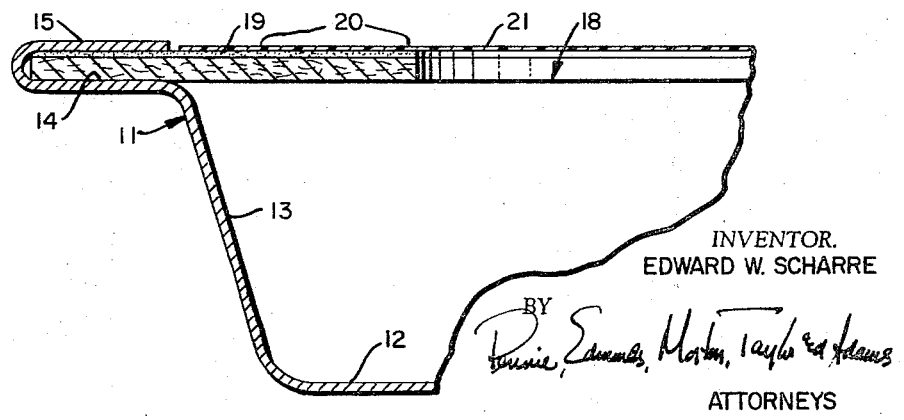
FIG. 3 is an enlarged fragmentary cross section of the container taken substantially along line 3—3 of FIG. 2.

In the drawings, a flat closure member 10 of the invention shown is attached to a rigid aluminum foil tray-type body 11 to form a package of the type generally used for the packaging of food stuffs, particularly frozen foods. As shown in FIG. 3, the tray is comprised of a bottom portion 12, rigid upstanding side portions 13, a flat circumferential rim portion 14 surrounding the tray opening and extending laterally outward from the upper edge of the side portions, and a flange portion 15 which is folded around the circumferential edge portion of the closure member that seats on the flat rim and down against the top surface of the closure member. This is a standard manner of attaching a closure to a tray of this type.

The closure member 10 is formed by die cutting a stiff material such as an aluminum foil paperboard laminate, rigid paperboard alone, Styrofoam (a trade name of the Dow Chemical Company, Midland, Mich. for rigid expanded cellular polystyrene) or some other rigid material to form a frame element 16 which in the embodiment shown has a generally rectangular outer configuration with rounded edges and has a tab 17 extending laterally from one rounded edge portion; a large central opening 18 is defined by the frame element. It is desired that the central opening be as large as possible and it is therefore preferred that it comprise approximately 45–75 percent of the surface area of the closure member. If the cover is used with a multi-compartment container and only a portion of the cover closing one compartment is to be opened, the percent of the surface area will be much smaller.

Figure 1:
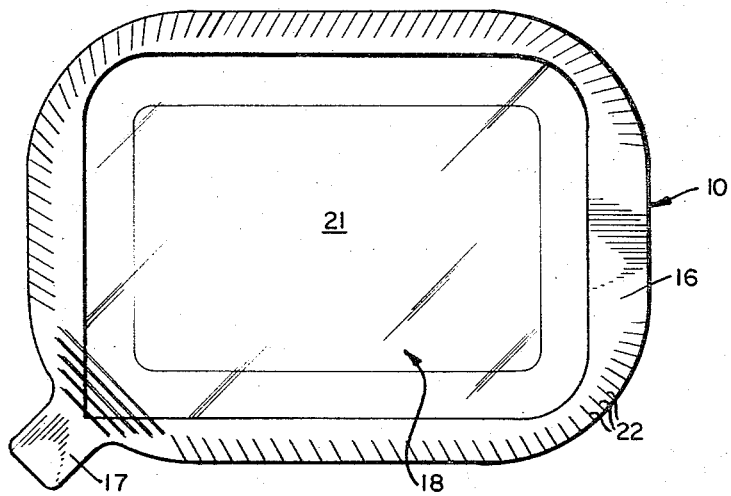
FIG. 1 is a plan view of one embodiment form of a closure member.
Figure 2:
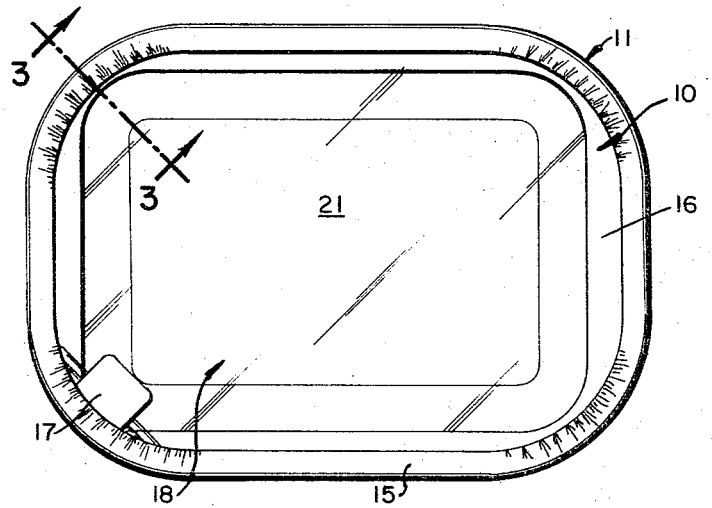
FIG. 2 is a plan view of an assembled container.

An adhesive coating 19 is applied to one surface of the frame element, which will be the top surface of the closure in its assembled position, along at least the inner marginal edge 20 thereof adjacent the central opening 18. A heat shrinkable film 21 is positioned over the central opening and is adhesively sealed to the frame element along its inner marginal edge 19 by the adhesive coating. As shown in FIGS. 1 and 2, the heat shrinkable film is inwardly spaced from the outer circumferential edge of the frame element and is free from the overlapping flange portion of the body member except along the tab 17; here an edge of the heat shrinkable film extends into the tab portion and in its closed position as shown in FIG. 2 where the tab portion is folded inwardly toward the center of the closure member, one edge of the heat shrinkable film is held tightly against the frame element. Of course, any other means can be used to hold an edge of the film to the frame element.

In most instances, the tab will not be necessary since the enlarged central opening should provide a large enough opening for removal of the contents; where it is provided peripheral score cuts 22 made in accordance with U.S. Patent No. 3,233,819 can advantageously be used in the construction.

In one preferred example, the heat shrinkable film had a high shrink energy of from 250–350 percent in both the machine and transverse directions and ranged in thickness from 0.0005 to 0.0015 inch; it also had a re-orientation temperature of from 150° F. to 220° F. Films as thick as 0.005 inch with a re-orientation temperature of as high as 450° F. can be employed depending upon the requirements of the contents being packaged and as will be seen in the selection of the adhesive. The film resin base may be oriented plasticized polyvinyl chloride, irradiated oriented polyethylene, oriented polypropylene, heavily oriented polyethyleneterephthalate or oriented rubber hydrochloride; irradiated polyethylene is preferred for packaging food stuffs since it will not give off hydrogen chloride at oven temperatures.

One example of the adhesive film which can be used is an adhesive containing 25 percent by weight Elvax (trade name of E. I. du Pont de Nemours, Wilmington, Del.) which is a polyethylene polyvinyl acetate co-polymer and 75 percent by weight of a 130° wax composition. This adhesive will release its bond at approximately 160° F. It is important that the adhesive selected be one that will release slightly above the temperature at which the film will begin to shrink. Should the adhesive release at too low a temperature or below the re-orientation temperature, the film will begin to fall into the food or other contents making a complete shrinkage impossible. On the other hand, should the adhesive fail to release until the film has begun to shrink significantly, the film will be torn apart by the stress and will leave web-like films on the food or other contents. It is therefore essential to balance the re-orientation temperature of the film and the release temperature of the adhesive bond to insure that the adhesive bond will not be released until the film is under a tensile stress but less than the tensile stress sufficient to tear the film member.

Figure 4:
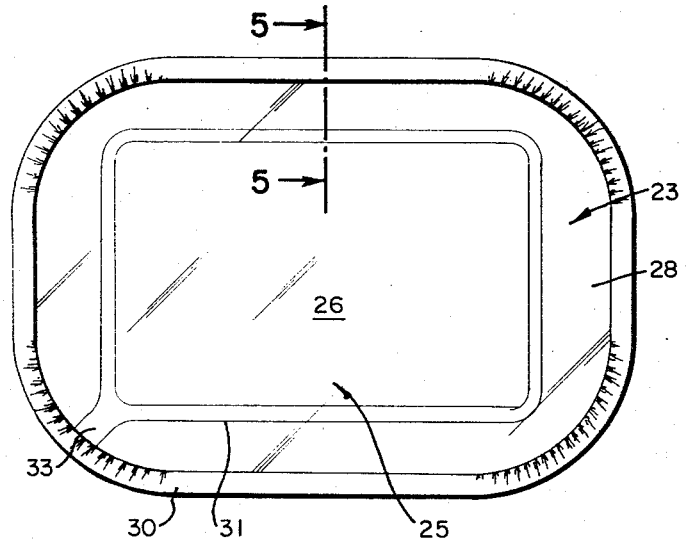
FIG. 4 is a plan view of a second embodiment of a closure member.
Figure 5:
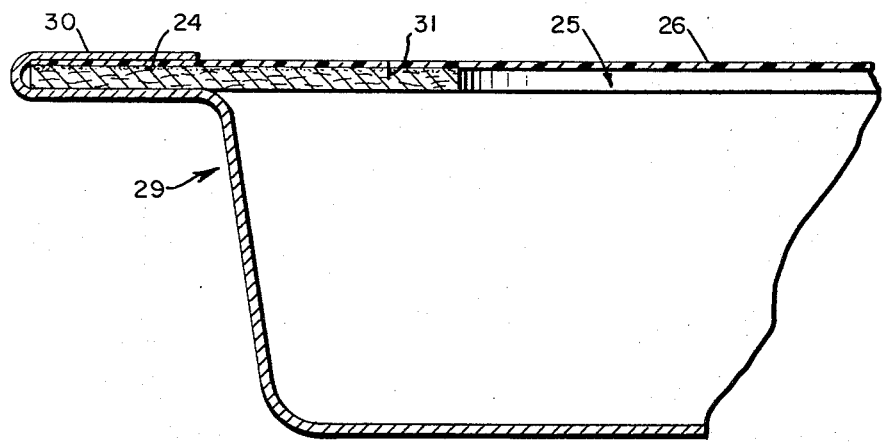
FIG. 5 is an enlarged fragmentary cross section of the closure member of FIG. 4 taken substantially along line 5—5.

A second embodiment of a closure member 23 of the invention shown in FIGS. 4 and 5; in the formation of this closure member 23 continuous strips of a rigid member such as cardboard, foil paperboard laminate or the like are coated along one entire surface with an adhesive coating 24 of the type described in the first embodiment. The coated strip is then die cut to form spaced central openings 25 in the continuous strip and the continuous strip is then coated along one surface with a heat shrinkable film 26 of the type described with respect to the first embodiment. The strips are then cut to length by die cutting individual frame elements 28 of the same general configuration as the closure described with respect to the first embodiment. In this embodiment, the heat shrinkable film is co-extensive with the outer peripheral edges of the frame element and the closure member is attached to a rigid foil tray 29 in the same manner as that described above with respect to the first embodiment wherein a flange portion 30 is folded around the edge of the closure member and flat against the outer marginal surface of the frame element.

In order to interrupt the heat shrinkable film so that it will not be locked under the folded over flange portion and thereby prevent shrinkage of the film, a continuous score cut 31 is made through the heat shrinkable film and into but not through the frame element outwardly spaced from the central opening to define a smaller inner surface area of heat shrinkable film inwardly spaced from the circumferential edge of the frame element which is adhesively secured around and closes the central opening and essentially has a tab portion 33 which extends outwardly and is mechanically locked beneath the folded over flange portion.

By this arrangement, upon being heated to the proper temperature and shrinkage of the film begins to occur upon release of the adhesive, the film will shrink away from the central opening but will be mechanically held beneath the flange portion of the tray body at the tab portion thereof.

I claim:
1. In a container of the type having a tray-like body member for holding contents, the improvement in a closure member in combination therewith comprising:
   (a) a frame element secured along its marginal outer edge to the body member and having a central opening therein;
   (b) a heat shrinkable film closing the central opening and sealed to the outer surface of the frame element and having a re-orientation temperature at which shrinkage begins; and
   (c) adhesive means securing the film of the frame element and releasing its adhesive bond at a temperature above the re-orientation temperature of the film and at which the film member is under a tensile stress less than a stress sufficient to tear the film member.

2. A container according to claim 1 comprising means other than said adhesive means for securing one portion of the heat shrinkable film to the frame element during shrinkage of the film.

3. A container according to claim 2 wherein said means for securing the heat shrinkable film to the frame element comprises a tab portion of the frame element folded down against a portion of the film.

4. A container according to claim 1 wherein said film is substantially co-extensive with the outer circumferential edge of the frame element and a score cut extends through the film and into but not through the frame element to define a smaller inner surface area of heat shrinkable film inwardly spaced from the circumferential edge of the frame element.

5. A container according to claim 1 wherein said closure member is secured to the tray body by a circumferential flange portion of the tray being folded around the edge of the frame element and down against a top surface portion thereof.

6. A container according to claim 5 wherein said flange portion is folded down against a portion of heat shrinkable film for holding the heat shrinkable film to the frame element during shrinkage of the film.

7. A closure member for attachment to a container body comprising:
   (a) a frame element having a central opening formed therein;
   (b) a heat shrinkable film closing the central opening and sealed to the outer surface of the frame element and having a re-orientation temperature at which shrinkage begins; and
   (c) adhesive means securing the film to the frame element and releasing its adhesive bond at a temperature above the re-orientation temperature of the film and at which the film member is under a tensile stress less than a stress sufficient to tear the film member.

8. A closure member according to claim 7 wherein the member is flat.

9. A closure member according to claim 7 wherein the film is inwardly spaced from the outer circumferential edge of the frame element along at least its major portion thereof.

10. A closure member according to claim 7 wherein said film is substantially co-extensive with the outer circumferential edge of the frame element and a score cut extends through the film and into but not through the frame element to define a smaller inner surface area of film inwardly spaced from the outer circumferential edge of the frame element.

References Cited

UNITED STATES PATENTS

| | | | |
|---|---|---|---|
| 2,775,383 | 12/1956 | Kollman et al. | 229—3.5 |
| 3,190,788 | 6/1965 | Loos | 161—164 |
| 3,233,819 | 2/1966 | Flaherty | 229—43 |
| 3,236,435 | 2/1966 | Nichols | 206—45.3 X |
| 3,298,505 | 1/1967 | Stephenson | 229—43 |
| 3,322,709 | 5/1967 | Hammer | 260—28.5 |

DAVIS T. MOORHEAD, *Primary Examiner.*